US012154173B2

(12) United States Patent
Rooney

(10) Patent No.: US 12,154,173 B2
(45) Date of Patent: *Nov. 26, 2024

(54) SYSTEMS AND METHODS FOR ROUTING TRADE ORDERS BASED ON EXCHANGE LATENCY

(71) Applicant: TRADING TECHNOLOGIES INTERNATIONAL INC., Chicago, IL (US)

(72) Inventor: Patrick Joseph Rooney, St. Charles, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,667

(22) Filed: Jun. 6, 2023

(65) Prior Publication Data
US 2023/0316401 A1 Oct. 5, 2023

Related U.S. Application Data

(63) Continuation of application No. 17/121,185, filed on Dec. 14, 2020, now Pat. No. 11,710,183, which is a continuation of application No. 16/203,083, filed on Nov. 28, 2018, now Pat. No. 10,896,466, which is a continuation of application No. 15/006,836, filed on Jan. 26, 2016, now Pat. No. 10,169,818, which is a continuation of application No. 13/722,649, filed on Dec. 20, 2012, now Pat. No. 9,280,791.

(51) Int. Cl.
*G06Q 40/04* (2012.01)
*H04L 43/0852* (2022.01)
*H04L 43/106* (2022.01)
*H04L 45/121* (2022.01)

(52) U.S. Cl.
CPC ......... *G06Q 40/04* (2013.01); *H04L 43/0858* (2013.01); *H04L 43/106* (2013.01); *H04L 45/121* (2013.01)

(58) Field of Classification Search
CPC ... G06Q 40/04; H04L 43/0858; H04L 43/106; H04L 45/121
USPC ...................................................... 705/3–44
See application file for complete search history.

(56) References Cited

U.S. PATENT DOCUMENTS 7,127,422 B1  10/2006 Bundy
7,242,669 B2   7/2007 Bundy et al.
(Continued)

OTHER PUBLICATIONS

Baron, et al., "Risk and Return in High-Frequency Trading", Journal of Financial and Quantitative Analysis, vol. 54, No. 3, pp. 993-1024, Michael G. Forster School of Business, University of Washington, Seatle, WA 98195, doi: 1017/S0022109018001096, (Year: Jun. 2019).*

(Continued)

*Primary Examiner* — Frantzy Poinvil
(74) *Attorney, Agent, or Firm* — McDonnell Boehnen Hulbert & Berghoff LLP

(57) ABSTRACT

Systems and methods for routing trade orders based on exchange latency are disclosed. An example method includes measuring a first latency associated with a first exchange based on a processing time of a first trade order; and routing a second trade order from a trading device to one of the first and a second exchange based on the first latency.

16 Claims, 9 Drawing Sheets

(56) References Cited

U.S. PATENT DOCUMENTS

| | | | |
|---|---|---|---|
| 7,366,790 B1* | 4/2008 | Rustad | H04L 43/10 370/232 |
| 8,073,946 B1 | 12/2011 | Jaeger et al. | |
| 8,655,767 B2 | 2/2014 | Ellis et al. | |
| 8,832,330 B1 | 9/2014 | Lancaster | |
| 8,937,974 B1 | 1/2015 | Pannell | |
| 9,280,791 B2 | 3/2016 | Rooney | |
| 9,329,047 B2 | 5/2016 | Jackson et al. | |
| 9,443,198 B1 | 9/2016 | Vitaladevuni | |
| 9,858,619 B2* | 1/2018 | Schmitt | G06Q 40/06 |
| 10,169,818 B2 | 1/2019 | Rooney | |
| 11,625,358 B1* | 4/2023 | Murarka | G06F 16/113 707/668 |
| 11,874,804 B2* | 1/2024 | Novotny | G06F 16/1837 |
| 2002/0023048 A1 | 2/2002 | Buhannic et al. | |
| 2002/0131399 A1* | 9/2002 | Philonenko | H04M 3/5232 370/411 |
| 2003/0065763 A1 | 4/2003 | Swildens et al. | |
| 2005/0125326 A1 | 6/2005 | Nangalia et al. | |
| 2010/0094743 A1 | 4/2010 | Robertson et al. | |
| 2010/0174634 A1 | 7/2010 | Bartko et al. | |
| 2012/0022999 A1 | 1/2012 | Bartko et al. | |
| 2012/0239556 A1 | 9/2012 | Magruder et al. | |
| 2014/0180889 A1 | 6/2014 | Rooney | |
| 2014/0279144 A1 | 9/2014 | Hyde et al. | |
| 2014/0279148 A1 | 9/2014 | Hyde et al. | |
| 2014/0359036 A1 | 12/2014 | Blakers et al. | |
| 2015/0073967 A1 | 3/2015 | Katsuyama et al. | |
| 2015/0185032 A1 | 7/2015 | Jackson et al. | |
| 2016/0140661 A1 | 5/2016 | Rooney | |
| 2017/0103457 A1* | 4/2017 | Acu?a-Rohter | G06Q 40/04 |
| 2017/0317944 A1 | 11/2017 | John et al. | |
| 2018/0075530 A1 | 3/2018 | Kavanagh et al. | |
| 2019/0349309 A1 | 1/2019 | Bonig et al. | |
| 2019/0095994 A1 | 3/2019 | Rooney | |
| 2019/0159238 A1 | 5/2019 | Kim et al. | |
| 2019/0334786 A1 | 10/2019 | Dutta et al. | |
| 2019/0334801 A1* | 10/2019 | Dutta | H04L 43/16 |
| 2019/0334802 A1 | 10/2019 | Dutta et al. | |
| 2020/0206619 A1 | 7/2020 | Van Der Laan et al. | |
| 2020/0382400 A1* | 12/2020 | Saka | G06Q 20/10 |
| 2023/0325921 A1* | 10/2023 | Kim | G06Q 40/04 |

OTHER PUBLICATIONS

"Pure Financial Academy Launch of New, Free Introductory Day-Trading Course", Publication info: M2 Pressure, Dialog Accession No. 380515138, (Year: Jul. 1, 2014).*

Balazs et al., "Counterparty Risk in Exchange-Traded Notes (ETNs)", The Journal of Fixed Income, New York, vol. 23, Iss. 1, 76-101, 4, Summer (Year: 2013).

Egginton, et al., "Quote Stuffing," Financial Management, Fall 2016, pp. 583-608.

Fleming et al., "Trading Activity And Price Transparency in the Inflation Swap Market", FRBNY Economic Policy Review, (Year: May 2013).

Gutmann, Michael, "Automated high frequency retail trading," Futures Magazine, Fall Special: Revolutions in Trading 2008.

International Search Report of International Application No. PCT/US2013/035645, dated May 14, 2013 (mailed May 31, 2013).

* cited by examiner

SYSTEMS AND METHODS FOR ROUTING TRADE ORDERS BASED ON EXCHANGE LATENCY

CROSS REFERENCE TO RELATED APPLICATIONS

This application is a continuation of U.S. patent application Ser. No. 16/203,083, filed on Nov. 28, 2018, now U.S. Pat. No. 10,896,466, which is a continuation of U.S. patent application Ser. No. 15/006,836, filed on Jan. 26, 2016, now U.S. Pat. No. 10,169,818, which is a continuation of U.S. patent application Ser. No. 13/722,649, filed on Dec. 20, 2012, now U.S. Pat. No. 9,280,791, the entire contents of each of which are incorporated herein by reference for all purposes.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

BRIEF DESCRIPTION OF THE FIGURES

Certain embodiments are disclosed with reference to the following drawings.

Figure 1:
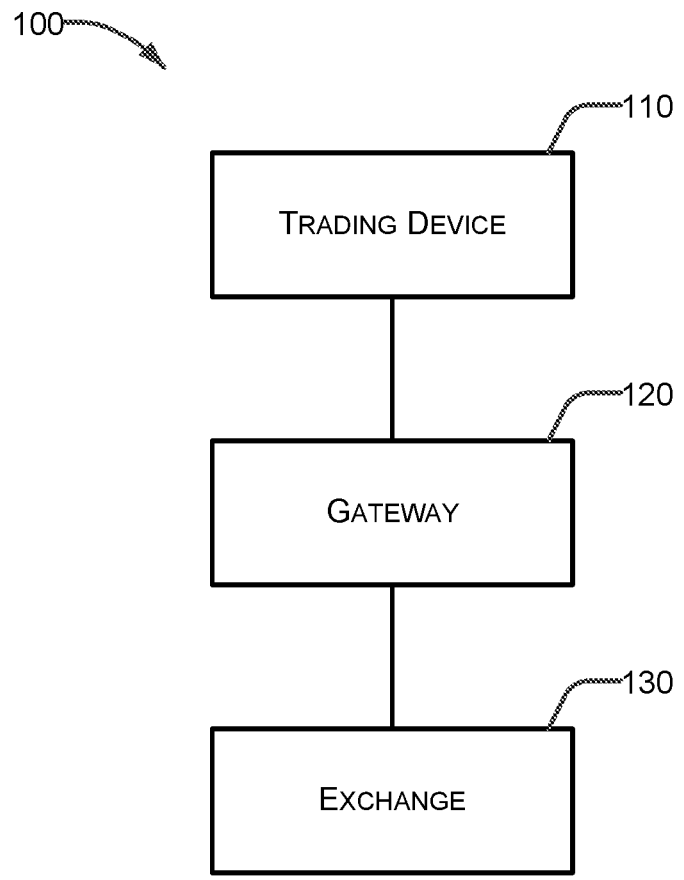
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The disclosed embodiments relate to trading systems and methods for routing trade orders based on exchange latency. In particular, the disclosed embodiments relate to systems and methods for routing trade orders for fungible tradeable objects between one or more exchanges having markets for the fungible tradeable objects based on a dynamic calculation of the time differential between the transmission of the trade order and receipt of a fill confirmation in response to that trade order.

Exchanges facilitate transactions between trading devices that buy and/or sell one or more tradeable objects. An order submitted to the exchange is, for example, a buy order or a sell order. The exchange attempts to match received orders with contra-side orders available in a corresponding market. For example, to fulfill a received buy order for a tradeable object, the exchange analyzes availability of the first tradeable object on a market. Similarly, to fulfill a received sell order for the tradeable object, the exchange analyzes demand for the tradeable object on the market. The exchange then processes the order in accordance with the current conditions of the market. To process the trade orders, the exchange executes and/or facilitates a plurality of calculations, transactions, and communications, each of which consumes an amount of time. The amount of time taken by the exchange to fulfill an order is referred to herein as latency. As described in detail below, the latency of an exchange may be measured in a plurality of different manners and/or using a plurality of different benchmarks, triggers, factors, etc.

In many instances, terms of the transactions facilitated by the exchange are time-sensitive. Accordingly, low latency from the exchange is desirable. The matching engines and/or other components utilized by the exchange to process orders may become bogged down due to, for example, server related issues, network connectivity issues, swells in trading activity, computationally expensive tasks such as implied pricing calculations, etc. In other words, one or more factors may cause an increase in time taken to process an order at an exchange. In many instances, the outcomes of a trade are significantly affected by small amounts of time. Thus, users and/or trading devices acting on behalf of users are highly interested in having trades processed by exchanges as quickly as possible.

Embodiments disclosed herein recognize that high latency at an exchange may be considered unacceptable for some or all types of orders. Embodiments disclosed herein also recognize that tradeable objects are often fungible across different exchanges and that trading devices and/or users of the trading devices can utilize any of a plurality of exchanges for such orders involving such tradeable objects. To improve the speed at which trading devices are able to have orders processed, embodiments disclosed herein enable monitoring of latency metrics for a plurality of exchanges and routing of one or more trade orders to selected ones of the exchanges based on the monitored latency metrics. For example, some embodiments disclosed herein detect individual latencies for a group of exchanges and select the exchange of the group having the lowest latency for routing of orders. In some embodiments disclosed herein, the exchanges of the monitored group are grouped according to one or more factors. For example, in some embodiments disclosed herein, the exchanges of the monitored group are associated with a particular type of order and the selection of the exchange having the lowest latency is for orders of the particular type.

In some embodiments disclosed herein, a primary exchange for one or more trading devices is monitored for latency and/or changes in latency by a primary latency monitor. Further, in some embodiments disclosed herein, the latency of the primary exchange is compared to one or more thresholds to determine whether the latency of the primary exchange has reached an undesirable level. Some embodiments disclosed herein direct orders to one or more secondary exchanges instead of the primary exchange when one of the thresholds has been exceeded. Additionally or alternatively, in some embodiments disclosed herein, the latency threshold(s) associated with the primary exchange being exceeded causes activation of one or more secondary latency monitors to measure latencies of the secondary exchanges.

In some embodiments disclosed herein, the one of the secondary exchanges having the lowest latency is selected for the rerouting of orders away from the primary exchange. Further, in some embodiments disclosed herein, trades are routed to the primary exchange when the latency of the primary exchange has recovered to a level below the latency threshold and/or a recovery threshold.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. BRIEF DESCRIPTION OF CERTAIN EMBODIMENTS

Certain embodiments provide an example method including measuring a first latency associated with a first exchange based on a first processing time of a first trade order. The example method includes routing a second trade order from a trading device to one of the first exchange and a second exchange based on the first latency.

Certain embodiments provide a tangible machine readable storage medium comprising example instructions that, when executed, cause a machine to measure a first latency associated with a first exchange based on a first processing time of a first trade order. The example instructions cause the machine to route a second trade order from a trading device to one of the first exchange and a second exchange based on the first latency.

Certain embodiments provide an example apparatus including a computing device to measure a first latency associated with a first exchange based on a first processing time of a first trade order. The computing device of the example apparatus is to route a second trade order from a trading device to one of the first exchange and a second exchange based on the first latency.

II. EXAMPLE ELECTRONIC TRADING SYSTEM

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or un-requested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. EXPANDED EXAMPLE ELECTRONIC TRADING SYSTEM

Figure 2:
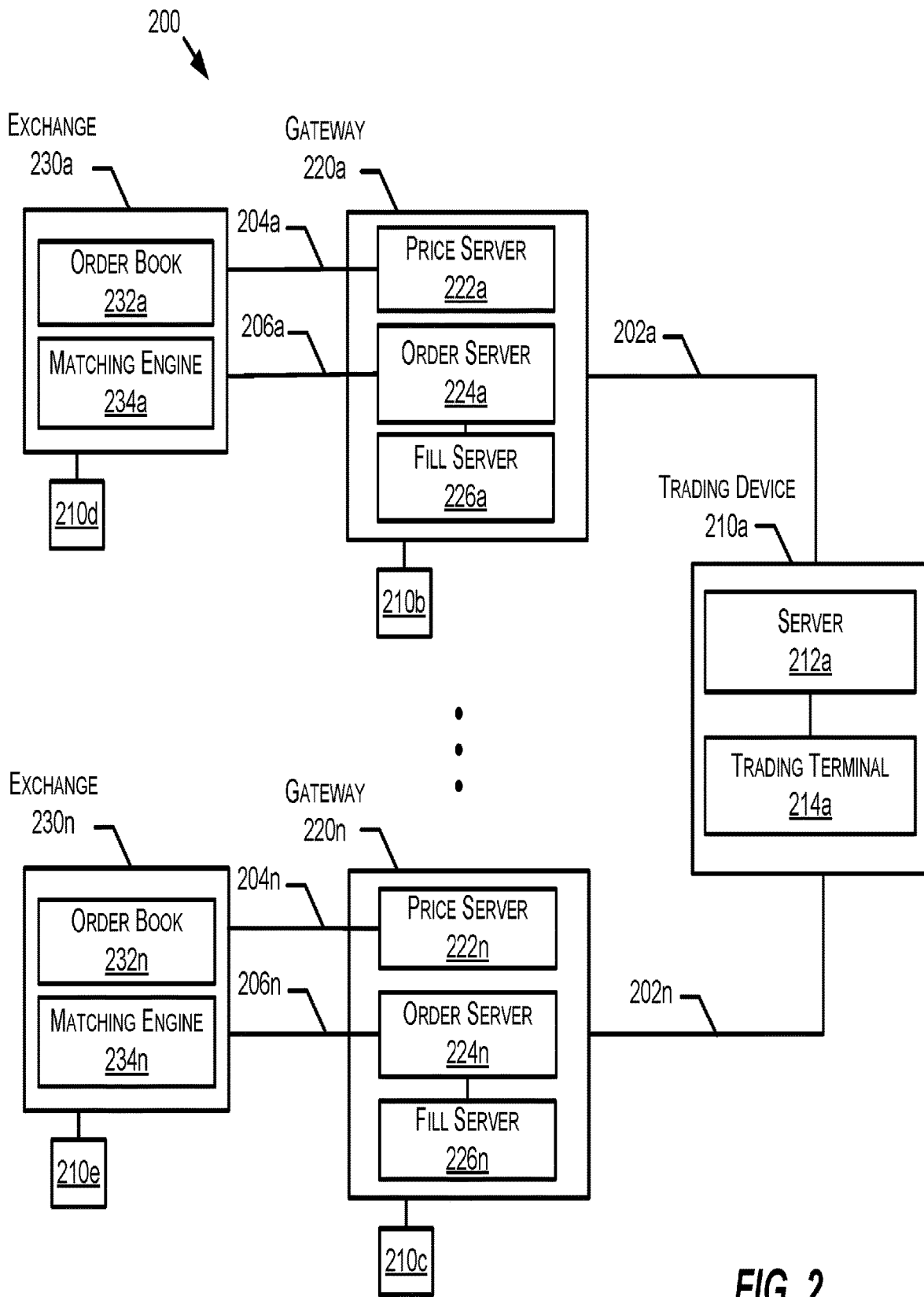
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. EXAMPLE COMPUTING DEVICE

Figure 3:
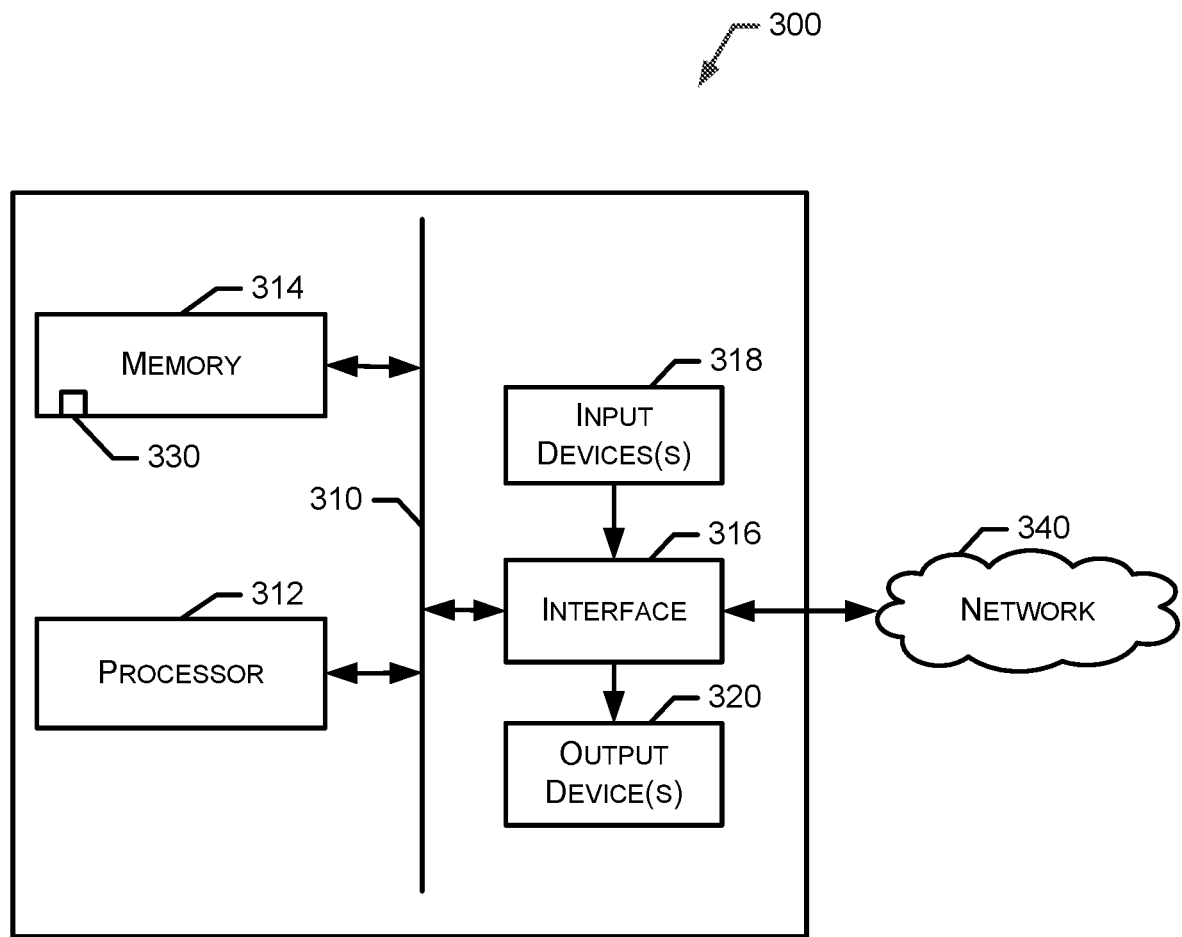
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

[The following section is for inclusion in cases that deal with strategy trading and should be removed (along with the corresponding FIG. 4) if not applicable.]

V. EXCHANGE LATENCY MONITORING

FIGS. 4-8 are flowcharts representative of example operations that can be executed to implement teachings of this disclosure. At least some of the example operations of FIGS. 4-8 can be implemented by, for example, the trading application 330 stored on and executed by the example trading device 110 of FIG. 1 and/or the example trading device 210 of FIG. 2. Additionally or alternatively, at least some of the example operations of FIGS. 4-8 can be implemented by, for example, one or more applications stored on and executed by the example exchanges 230a, 230n of FIG. 2 and/or the example gateways 220a, 220n of FIG. 2. While the example trading device 110 of FIG. 1 is described as implementing the example operations of FIGS. 4-8 below, any suitable device can implement the example operations of FIGS. 4-8.

The example operations of FIGS. 4-8 enable routing of trade orders to different exchanges based on latency information associated with the exchanges. Put another way, the example operations of FIGS. 4-8 enables selection of an exchange for a trade order based on indications that the selected exchange is likely to process the trade order faster than other exchange(s). To provide trading devices and/or users of the trading devices with the disclosed capability, the example operations of FIGS. 4-8 measure one or more aspects of trade order processing at the different exchanges. In particular, the example operations of FIGS. 4-8 analyze timestamp data associated with trade orders processed by the different exchanges to measure amounts of time taken by the exchanges to process trade orders. Depending on a plurality of factors and/or circumstances, some exchanges may experience periods of increased latency and/or may underperform in terms of processing speed when compared to other exchanges. The example operations of FIGS. 4-8 detect periods of increased latency at specific exchanges and/or determine which of a plurality of exchanges has the lowest latency at a particular time. The example operations of FIGS. 4-8 make one or more routing decisions for trade order(s) associated with, for example, a particular user and/or trade order(s) of a particular type based on the monitored latency information of the exchanges.

A plurality of different monitoring techniques and/or schemes can be used in connection with the teachings of this disclosure. Further, a plurality of different trade order routing strategies can be implemented in connection with the teachings of this disclosure. To illustrate first example monitoring and routing techniques and/or mechanisms constructed in accordance with the teachings of this disclosure, FIG. 4 includes example operations that route trade orders of different types based on a selection of an exchange having a lowest latency for a period of time across different types of trade orders. In other words, the example operations of FIG. 4 select an exchange as the destination for all types of trade orders based on processing performance measurements associated with all types of trade orders at the exchanges. To illustrate second example monitoring and routing techniques and/or mechanisms constructed in accordance with the teachings of this disclosure, FIG. 6 includes example operations that route trade orders of a particular type based on a selection of an exchange having a lowest latency for the particular type of trade order. In other words, the example operations of FIG. 6 select an exchange as the destination for a particular type of trade order based on processing performance measurements associated with the particular type of trade orders at the exchanges. To illustrate third example monitoring and routing techniques and/or mechanisms constructed in accordance with the teachings of this disclosure, FIG. 7 illustrates example monitoring operations that determine whether a latency threshold is exceeded at a primary exchange and, if so, calculate latencies of secondary exchanges to select one of the secondary exchanges as a destination for trade orders. Additional or alternative monitoring and/or routing techniques and/or mechanisms to the examples of FIGS. 4-8 can be implemented in connection with the teachings of this disclosure.

Figure 4:
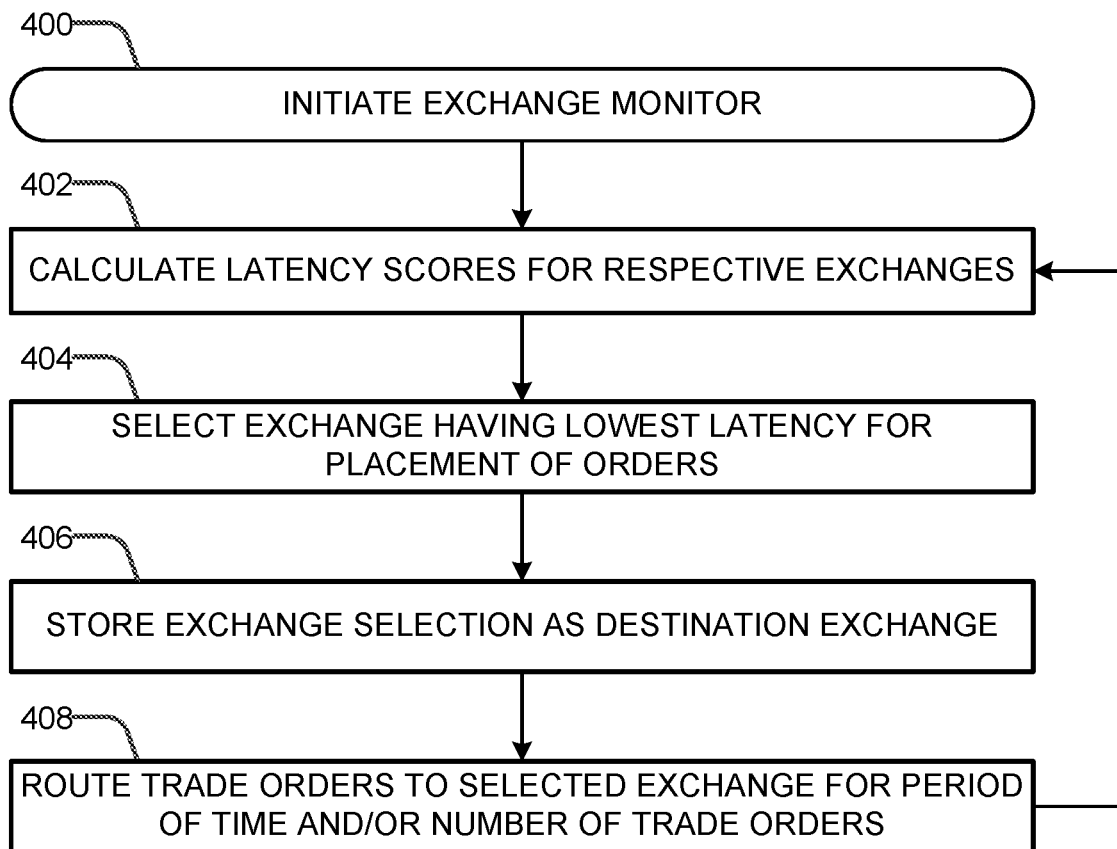
FIGS. 4-8 are flowcharts representative of example machine readable instructions that may be executed to implement disclosed embodiments.

The example of FIG. 4 begins with an initiation of an exchange monitor by, for example, a user and/or application of the trading device 110 of FIG. 1 and/or the trading device 210*a* of FIG. 2 (block 400). As an outcome of a trade order submitted to an exchange can depend on a speed at which the exchange processes the trade order, the user has a strong interest in submitting trade orders to exchanges having low latency processing characteristics. In the example of FIG. 4, the user and/or trading device acting on behalf of the user is one having access to a plurality of exchanges. That is, the user and/or the trading device can select an exchange from a set of exchanges as a destination for one or more trade orders. For example, with reference to FIG. 2, the user of the trading device 210*a* is capable of routing or directing trade orders to any of the exchanges 230*a*-230*n*.

The example operations of FIG. 4 include calculating latency scores for respective ones of the set of exchanges to which the corresponding trading device has access (block 402). In some examples, a latency score is calculated for each of the exchanges to which the trading device has access. Alternatively, a latency score may be calculated for each of a subset of the exchanges to which the trading device has access. For example, the trading device and/or the user of the trading device may define one or more subsets of exchanges according to, for example, type(s) of trade orders to be handled by the corresponding exchanges and/or client designations associated with the trade orders. Example manners of calculating the latency scores for the exchanges are described below in connection with FIG. 5. As described below, latency information associated with an exchange includes, for example, an average turnaround time for trade orders placed at the exchange over a certain period of time and/or a number of processed trade orders. In some examples, the latency information associated with the exchange includes a rolling average of turnaround times for trade orders placed at the exchange. In some examples, the calculation of the latency scores is performed according to a schedule shared across the different exchanges. In such instances, latency information is collected and analyzed at the same time for each of the exchanges. Additionally or alternatively, the calculation of the latency score at a first one of the exchanges may occur at a different time as the calculation of the latency score at a second one of the exchanges. For example, the calculation of the latency score at the first exchange may occur in response to a first schedule dedicated to the first exchange and the calculation of the latency score at the second exchange may occur in response a second schedule dedicated to the second exchange. Additionally or alternatively, the calculation of the latency score for one or more of the exchanges may occur in response to the corresponding exchange processing a threshold number of trade orders. In other words, the calculation of the latency score for an exchange may occur when the exchange has processed one hundred (100) trade orders since the previous calculation of latency scores. Other methods and/or techniques of calculating the latency scores are possible.

The example operations of FIG. 4 use the calculated latency scores to select one of the exchanges as the destination for trade orders placed, for example, over a subsequent period of time and/or for a subsequent number of trade orders (block 404). For example, the selected exchange may be the destination for the next fifty (50) trade orders placed by the trading device. Additionally or alternatively, the selected exchange may be the destination for trade orders placed by the trading device in the next hour, the current day, or the next three (3) days. In the illustrated example of FIG. 4, the selection of the exchange includes comparing the latency scores of the monitored set of exchanges to identify which one of the exchanges has the lowest latency. In other words, the example of FIG. 4 identifies which one of the monitored exchanges is currently processing trade orders faster than the other exchanges of the set. Thus, in the illustrated example of FIG. 4, the exchanges of the monitored set of exchanges compete, perhaps unknowingly, for the trade orders of the trading device and/or the user of the trading device.

The example operations of FIG. 4 include storing an indication of the exchange selection for the current period of time and/or number of trade orders (block 406). In some examples, the exchange selections are stored and later analyzed to generate statistics and/or other metrics indicative of exchange performance. Such statistics and/or metrics are used to, for example, evaluate a business relationship and/or terms thereof with the individual exchanges. In some examples, the exchange selection indications may be shared with, for example, a third party interested in evaluating the performance characteristics associated with the exchanges. In some examples, the exchange selection indications are provided to proprietors of the exchanges to enable the proprietors to identify potential improvements, potential problems, and/or successes.

The example operations of FIG. 4 include routing trade orders to the exchange selected based on the latency information associated with the set of exchanges (block 408). In the illustrated example of FIG. 4, the trade orders are routed to the selected exchange for a period of time and/or a number of consecutive trade orders. For example, trade orders may be routed to the selected exchange for the next hour or until twenty (20) trade orders have been submitted to the selected exchange, whichever occurs first. In some examples, the period of time and/or number of trade orders that defines the routing to the selected exchange corresponds to the rate at which the latency scores are calculated for the exchanges. That is, the routing of the trade orders to a first selected exchange may last until a subsequent selection of, for example, a second different exchange based on new latency information.

Figure 5:
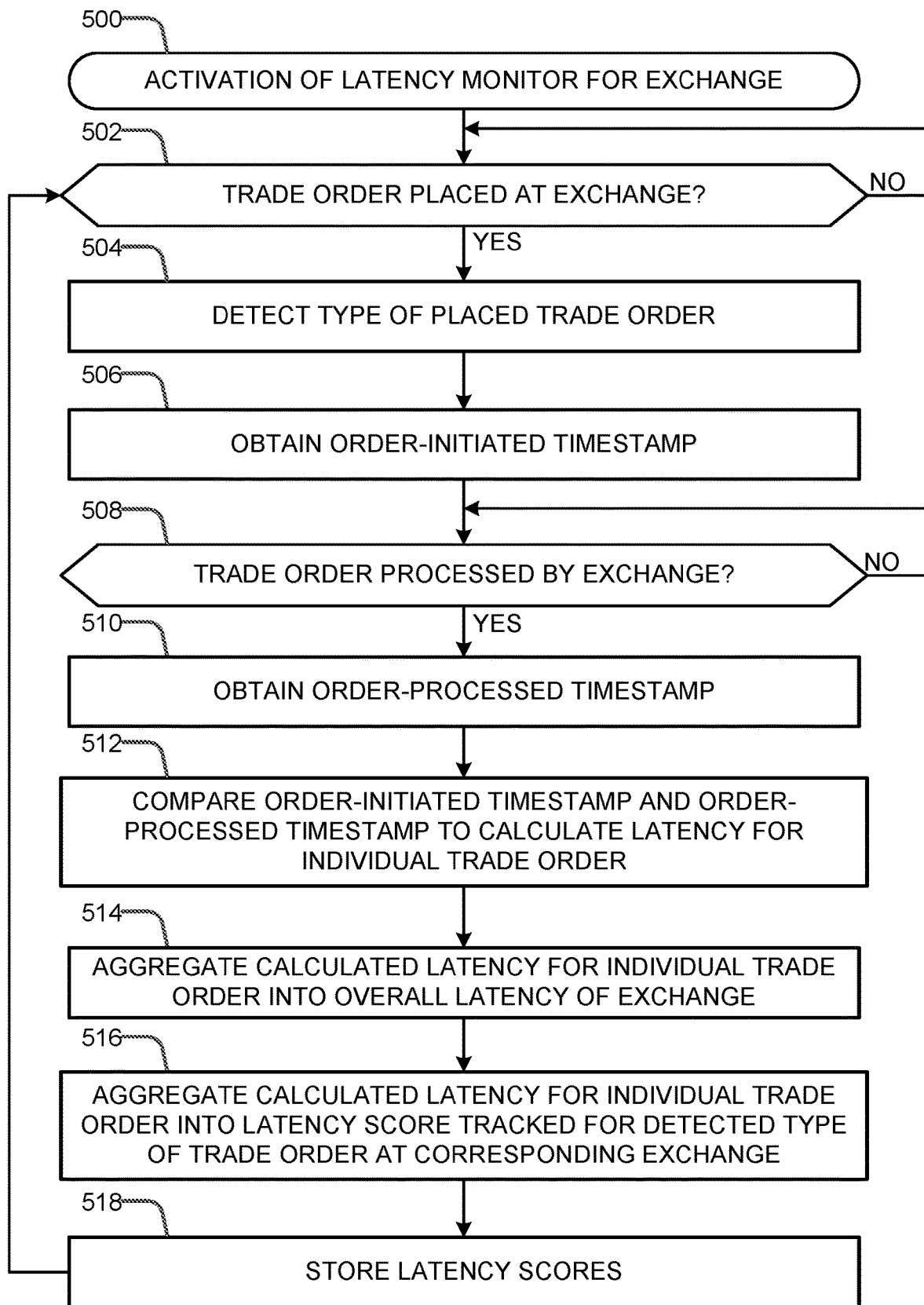

The example of FIG. 5 illustrates example monitoring operations to monitor for an exchange such as, for example, the exchange 130 of FIG. 1 and/or any of the exchanges 230a-230n of FIG. 2. The example of FIG. 5 may implement, for example, block 402 of FIG. 4 described above, block 602 of FIG. 6 described below, block 704 of FIG. 7 described below, and/or block 710 of FIG. 7 described below. The example of FIG. 5 begins with an activation of an exchange monitor by, for example, a user and/or application of the trading device 110 of FIG. 1 and/or the trading device 210a of FIG. 2 (block 500). In some examples, one or more of the example operations of FIG. 5 are stored and executed at the exchange being monitored. In such instances, an application stored on and executed by the trading device 110 of FIGS. 1 and/or 210a of FIG. 2 may initiate and/or communicate with the operations stored and executed at the exchange being monitored. In some examples, one or more of the example operations of FIG. 5 are stored and executed at a gateway servicing the exchange being monitored. In such instances, an application stored on and executed by the trading device 110 of FIGS. 1 and/or 210a of FIG. 2 may initiate and/or communicate with the operations stored and executed at the gateway corresponding to the exchange being monitored.

The example operations of FIG. 5 include detecting placement of a trade order at the monitored exchange (block 502). For example, a type of message dedicated to new trade orders and/or an indication in a communication message indicative of a new order may be detected as received at the monitored exchange. In the example of FIG. 5, a type of the received trade order is detected (block 504). Put another way, the received trade order is categorized according to one or more characteristics of the trade order. Example characteristics of a trade order that are used to categorize the trade order include a type of good associated with the trade order, whether the trade order is a buy order or a sell order, whether the trade order is part of a trading strategy such as a spread trade, whether the trade order is a market order, whether the trade order is a limit order, a market to which the trade order is directed, a size of the trade order, whether the trade order is directed to a domestic market, whether the trade order is directed to an overseas market, whether the trade order is directed to an international market, and/or any other aspect or characteristic of the trade order.

To calculate a latency of the exchange associated with the received order, the example operations of FIG. 5 include obtaining a timestamp corresponding to receipt of the trade order at the exchange (block 506). In the illustrated example of FIG. 5, the timestamp corresponding to receipt of the trade order is referred to as an order-initiated timestamp and is indicative of a time at which the monitored exchange begins processing the trade order. The example order-initiated timestamp is obtained by, for example, referencing a system clock at a time when the received trade order is detected at, for example, an interface in communication with a gateway. Additional or alternative data can be analyzed and/or obtained to determine a time at which the exchange begins processing the trade order.

The example operations of FIG. 5 include determining when the exchange has processed the received trade order (block 508). For example, the trade order is considered processed when a matching engine of the exchange has matched the terms of the received trade order with a contra-side trade order(s) available on a market, facilitated the exchange of the received trade order and the matched contra-side trade order(s), and delivered the resulting contracts to the trading device from which the trade order was received. Additional considerations and/or milestones in the processing of the trade order may mark the completion on which the latency calculation is based.

The example operations of FIG. 5 capture and/or generate a timestamp corresponding to the time at which the trade order is considered fully processed by the exchange (block 510). In the illustrated example of FIG. 5, the timestamp corresponding to the completion of the trade order processing at the exchange is referred to as an order-processed timestamp. The example order-processed timestamp is obtained and/or generated by, for example, referencing a system clock at a time when the received trade order is considered processed, such as when a message indicating the fulfillment of the trade order is sent to the trading device that conveyed the trade order to the exchange.

The example operations of FIG. 5 include comparing the order-initiated timestamp and the order-processed timestamp to calculate a turnaround time or latency for the individual trade order (block 512). In particular, a different between the order-initiated timestamp and the order-processed timestamp represents the amount of time taken by the exchange to process the trade order. This calculated amount of time is referred to herein as exchange latency or a turnaround time. The calculated turnaround time for the individual trade is stored in memory and can be used as a basis of an exchange selection disclosed herein.

In the illustrated example of FIG. 5, individual latency measurements associated with the monitored exchange are aggregated or combined to form an overall or collective latency score for the monitored exchange (block 516). The amount of latency measurements that form the collective latency score for the exchange can vary according to, for example, user settings and/or a volume of trade orders typically processed at the exchange. For example, a first collective latency score for a first exchange handling a first average volume may include latency measurements associated with a previous five hundred (500) trade orders and a second collective latency score for a second exchange handling a second average volume may include latency measurements associated with a previous five thousand (5,000) trade orders. Additionally or alternatively, the aggregation of the latency measurements can include calculating a rolling average, calculating a mean, calculating a standard deviation, and/or any other suitable statistics and/or metric.

In the illustrated example of FIG. 5, individual latency measurements associated with trade orders having at least one characteristic in common are aggregated to form a latency score for trade orders of a similar type (block 516). For example, latency measurements associated with buy orders may be aggregated to form a first type-specific latency score for the exchange. Further, sell orders may be aggregated to form a second type-specific latency score for the exchange. Further, trade orders associated with a first good may be aggregated to form a third type-specific latency score for the exchange. Further, trade orders associated with a second good may be aggregated to form a fourth type-specific latency score for the exchange. Further, trade orders exceeding a first size threshold may be aggregated to form a fifth type-specific latency score for the exchange. Further, trade orders exceeding a second size threshold may be aggregated to form a sixth type-specific latency score for the exchange. Additional or alternative types and/or categorizations of the trade orders and the corresponding latency scores are possible.

The example operations of FIG. 5 include storing the calculated individual latency scores, the collective latency score for the exchange, and/or the type-specific latency scores for the exchange (block 518). As described in detail below, the stored latency scores form the basis of one or more routing decisions for users and/or trading devices wanting to place trade orders with exchanges providing short turnaround times.

Figure 6:
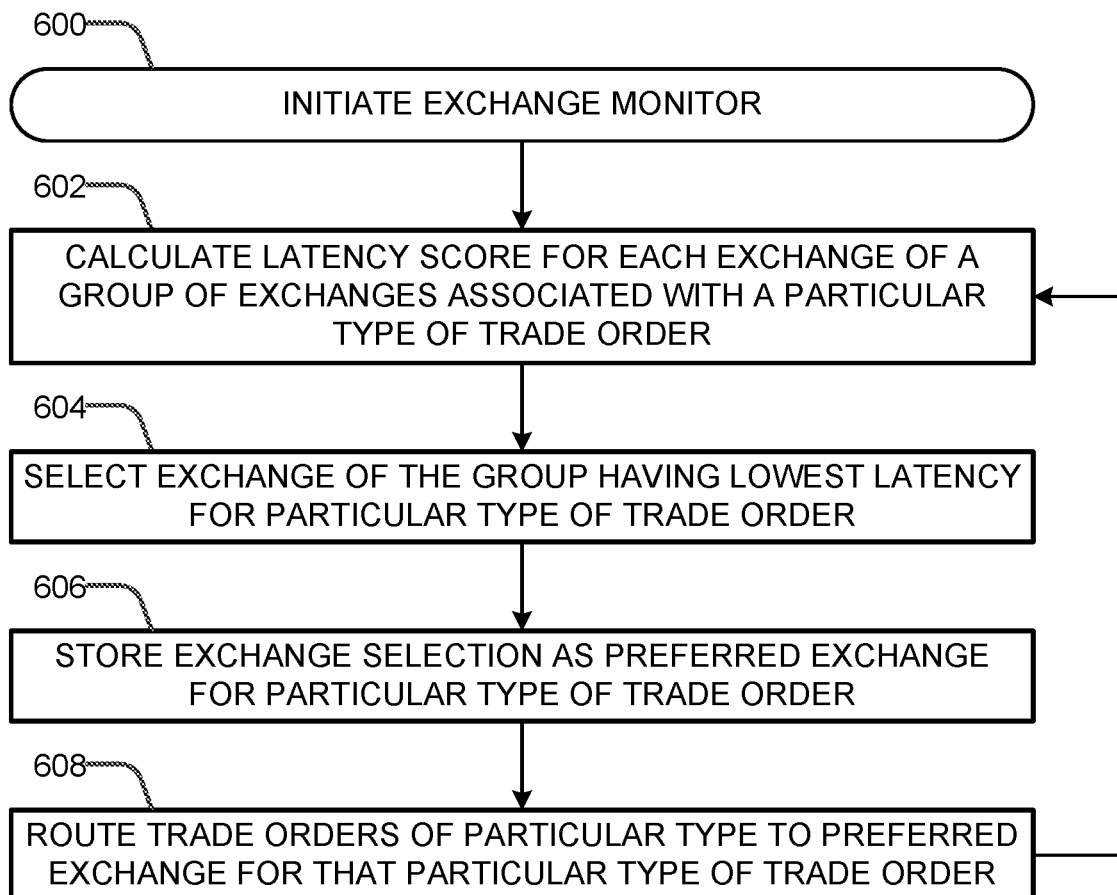
Figure 7:
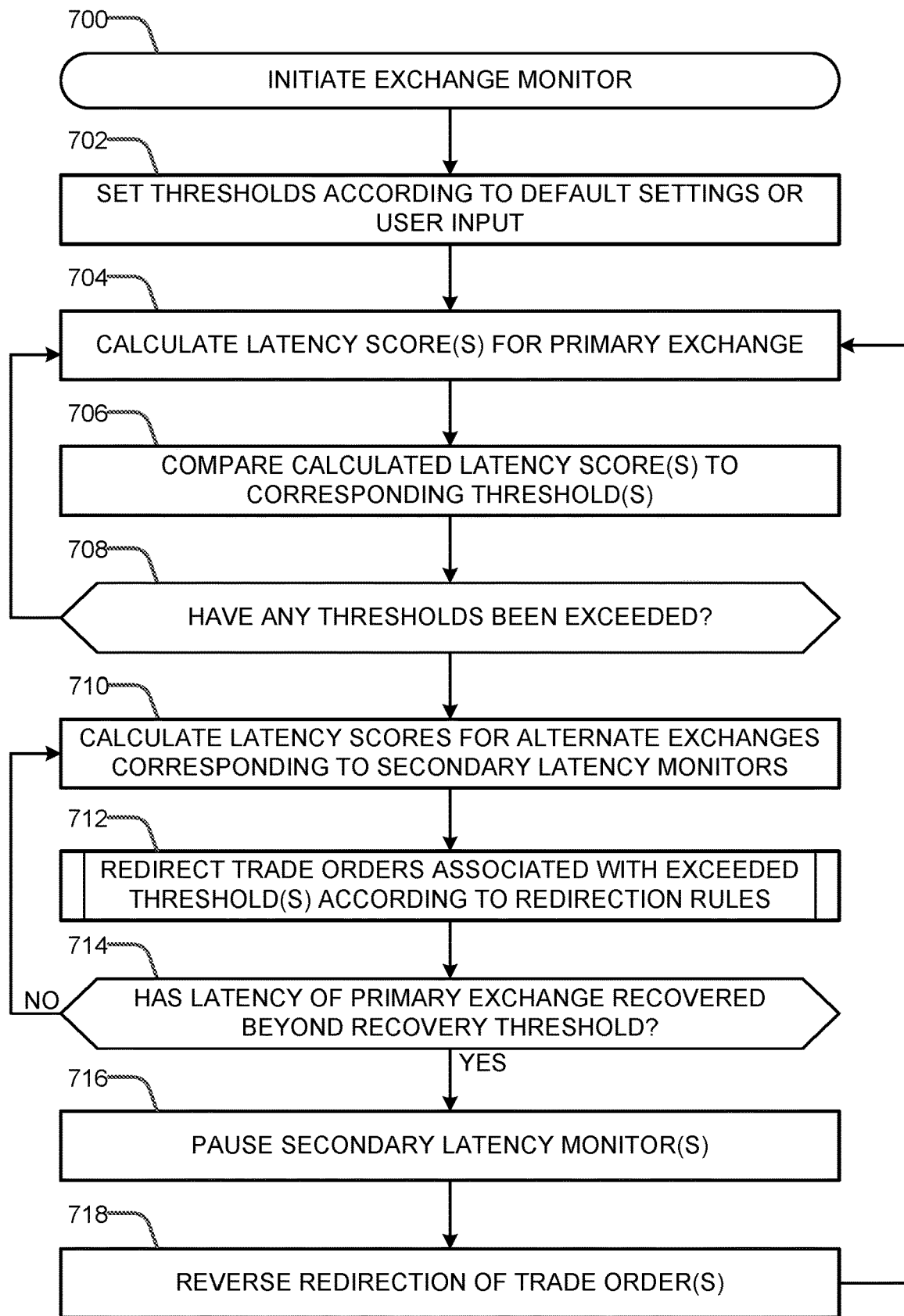

FIG. 6 illustrates example operations similar to the example operations of FIG. 4. As described below, in addition or in lieu of the example considerations of FIG. 4, the example operations of FIG. 6 consider type-specific latency information in the selection of an exchange as a destination for trade orders.

The example of FIG. 6 begins with an initiation of an exchange monitor by, for example, a user and/or application of the trading device 110 of FIG. 1 and/or the trading device 210a of FIG. 2 (block 600). The example operations of FIG. 6 include calculating type-specific latency scores for each exchange of a group of exchanges designated by, for example, the trading device as able to receive trade orders of a particular type (block 602). For example, the operations of FIG. 5 may be used to implement block 602 of FIG. 6. As described above, the example operations of FIG. 5 result in one or more type-specific latency scores being generated for the monitored exchange. In the example of FIG. 6, latency scores for particular types of trade orders are calculated for groups of exchanges assigned to the particular types of trade orders. For example, a first group of exchanges may be assigned to a first type of trade order by, for example, a user and/or a trading device acting on behalf of the user. Further, a second group of exchanges may be assigned to a second type of order. The first and second groups may overlap.

For each of the type-specific groups, the example operations of FIG. 6 select an exchange having the lowest latency as a destination for trade orders of the corresponding type (block 604). The selection of the exchange as the destination of the trade orders is used, for example, to route trade orders placed over a subsequent period of time and/or to route a subsequent number of trade orders. For example, the selected exchange may be the destination for the next fifty (50) trade orders of the corresponding type placed by the trading device. Additionally or alternatively, the selected exchange may be the destination for trade orders of the corresponding type placed by the trading device in the next hour, the current day, or the next three (3) days. Thus, the example operations of FIG. 6 identifies which one of the exchanges of a group of exchanges assigned to a particular type of trade order is currently processing trade orders faster than the other exchanges of the type-specific group.

The example operations of FIG. 6 store an indication of the exchange selection for the current period of time and/or number of trade orders (block 606). Further, the example operations of FIG. 6 include routing trade orders to the exchange selected based on the latency information associated with the type-specific group of exchanges (block 608). In the illustrated example of FIG. 6, the trade orders are routed to the selected exchange for a period of time and/or a number of consecutive trade orders of the corresponding type.

FIG. 7 illustrates example operations to monitor processing times of a primary exchange and, in response to determining that one or more processing times associated with the primary exchange have reached an undesirable length, rerouting trade orders to one or more secondary or alternate exchanges. The example of FIG. 7 begins with an initiation of an exchange monitor by, for example a user and/or application of the trading device 110 of FIG. 1 and/or the trading device 210a of FIG. 2 (block 700). The trading device and/or the user of the trading device utilizing the example operations of FIG. 7 is aware that exchange servers, such as matching engines, may experience periods of high latency and, thus, have the potential to adversely affect an outcome of one or more trade orders. Accordingly, the initiating trading device utilizes the example operations of FIG. 7 to detect periods of high latency at a primary exchange and to direct trade orders away from the primary exchange. The trading device utilizing the example operations of FIG. 7 may have a primary exchange for different types of trade orders, for different clients, for different times of day, and/or according to any other suitable characteristic or consideration. Further, the trading device utilizing the example operations of FIG. 7 designates one or more secondary or alternate exchanges for each of the primary exchange designations. As described below, the primary exchange is used as the designation for corresponding trade orders until a latency threshold is exceeded at the primary exchange. In response to the latency threshold being exceeded, the secondary exchanges are at least considered for routing of the trade orders in lieu of the primary exchange.

In the example of FIG. 7, the latency thresholds for the respective primary exchanges are set to default values and/or user-specified values (block 702). The latency thresholds of FIG. 7 represent respective levels of latency at which the user desires to reroute trade orders. In some examples, different latency thresholds are assigned to different types of trade orders for the primary exchange. That is, a first one of the latency thresholds of FIG. 7 at a primary exchange may correspond to a first type of trade order and a second one of the latency thresholds of FIG. 7 at the primary exchange may correspond to a second type of trade order. Additionally or alternatively, a collective latency threshold may be assigned to the primary exchange. As described above, the collective latency measurement of an exchange reflects the turnaround time of the exchange across different types of trade orders. The example thresholds of FIG. 7 can be configured and/or assigned in any suitable manner to any suitable type of latency measurement and/or metric.

The example operations of FIG. 7 include calculating latency score(s) for the primary exchange (block 704). An example implementation of block 704 of FIG. 7 is described above in connection with FIG. 5. As described above, the example operations of FIG. 5 result in one or more latency scores being generated for a monitored exchange. The latency scores generated via the example operations of FIG. 5 are statistics representative of, for example, recent processing time performance of the exchange. The example operations of FIG. 7 include comparing the calculated latency score(s) to corresponding ones of the latency thresholds (block 706). In other words, the example operations of FIG. 7 determine whether the primary exchange is not processing trade orders fast enough. If none of the latency thresholds has been exceeded (block 708), control returns to block 704 of FIG. 7.

If any of the latency thresholds have been exceeded (block 708), the example operations of FIG. 7 calculate latency scores for the corresponding secondary or alternative exchanges (block 710). An example implementation of block 710 of FIG. 7 is described above in connection with FIG. 5. In the illustrated example of FIG. 7, the latency information for the secondary exchanges is not monitored or generated until one of the latency thresholds is exceeded at the primary exchange. In some examples, the latency information for the second exchanges is generated and maintained simultaneously with the monitoring of the primary exchange latency information. Based on the latency information calculated for the secondary exchanges at block 710, the example operations of FIG. 7 redirect trade orders otherwise destined for the primary exchange to one of the secondary exchanges in accordance with a redirection rule (block 712). An example implementation of block 712 is described below in connection with FIG. 8.

While the trade orders are being redirected to the selected one of the secondary exchanges, the example operations of FIG. 7 periodically determine whether processing performance at the primary exchange has recovered beyond a recovery threshold (block 714). In some examples, the recovery threshold represents a lower latency than the latency threshold that was previously exceeded. In some examples, the recovery threshold is the same or substantially similar to the latency threshold that was previously exceeded. If the processing performance of the primary exchange has not sufficiently recovered (block 714), the example operations of FIG. 7 continue to redirect trade orders to the selected secondary exchange (block 710). Otherwise, if the processing performance of the primary exchange has sufficiently recovered (block 714), the example operations of FIG. 7 pause the latency monitoring of the secondary exchanges (block 716). In some examples, the latency monitoring of the second exchanges may continue after the primary exchange has sufficiently recovered. Further, if the processing performance of the primary exchange has sufficiently recovered (block 714), the example operations of FIG. 7 reverse the redirection of trade orders to the secondary exchanges and restore the primary exchange as the destination for the trade orders (block 718). Control then passed to block 704 and the latency monitoring of the primary exchange is executed.

Figure 8:
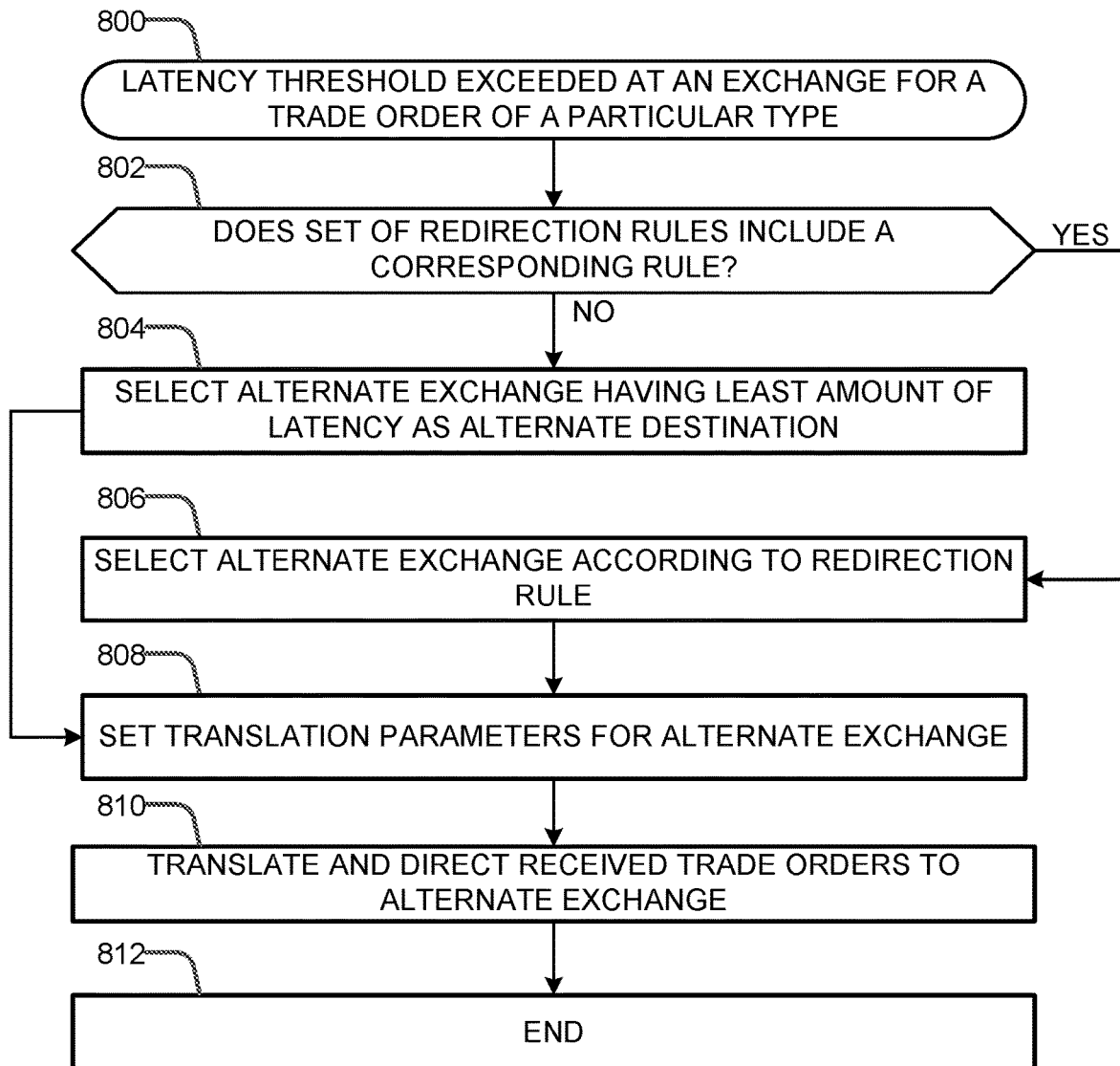

FIG. 8 illustrates example operations to reroute trade orders in response to processing performance of the primary exchange of FIG. 7 being indicative of too great a latency according to, for example, a corresponding threshold set by the user. As described in detail below, the example operations of FIG. 8 utilize a set of redirection rules that are configured by, for example, the user and/or a trading device acting on behalf of the user. The example redirection rules utilized by the example operations of FIG. 8 reflect desires of the user as to which of the corresponding secondary exchanges should be selected as the alternate destination for trade orders.

The example of FIG. 8 begins with an indication that one of the latency thresholds associated with a primary exchange has been exceeded or otherwise violated (block 800). In the illustrated example of FIG. 8, the indication includes information associated with the detected violation of the latency threshold including an identifier of the primary exchange, identifier(s) of the corresponding secondary exchanges, and a designation of a particular type of trade order corresponding to the violated latency threshold. The example redirection rules utilized by the example operations enable trading devices and/or users of the trading devices to define a redirection rule using one or more bases. For example, a user can define a dedicated redirection rule for an exchange. Additionally or alternatively, a user can define a redirection rule for trade order of a particular type. Additionally or alternatively, a user can define a redirection rule for the particular latency thresholds described above. In some examples, more than one redirection rule applies to an occurrence of a latency threshold being exceeded. In such instances, the redirection rules may include a hierarchy of which redirection rules have priority over other ones of the redirection rules.

The example operations of FIG. 8 use the received information associated with the violation of the latency threshold to query the set of the redirection rules (block 802). In particular, the example operations of FIG. 8 determine whether the set of redirection rules includes a redirection rule for the exceeded latency threshold, the exchange at which the latency threshold was exceeded, and/or the type of trade order associated with the exceeded latency threshold (block 802). The redirection rules may use any suitable basis or bases for determining a redirection of one or more trade orders to certain exchanges. In some examples, the redirection rules are based on static factors. For example, a first one of the redirection rules redirects trade orders from a first exchange to a second exchange when latency at the first exchange exceeds a threshold during a first time of day and to a third exchange when latency at the first exchange exceeds the threshold during a second time of day. Additionally or alternatively, the redirection rules are based on dynamic factors. For example, a second one of the redirection rules redirects trade orders based on available volume at respective alternate exchanges for the tradeable object(s) of the trade orders. In some examples, the second redirection rule determines whether sufficient volume is available at a first alternate exchange and, if so, redirects the trade order to the first exchange. If sufficient volume is not available at the first alternate exchange, the example second redirection rule determines whether sufficient volume is available at a second alternate exchange (for example, according to a hierarchy of exchanges defined in the second redirection rule). In some examples, the second redirection rule compares available volumes at different alternate exchanges and selects the exchange having, for example, the greater available volume for redirection of the trade orders. Additional or alternative bases are possible for the redirection rules. Further, the redirection rules are configurable by, for example, a corresponding user and/or a trading device acting on behalf of the user.

In the illustrated example, if the set of redirection rules does not include a corresponding redirection rule (block 802), the example operations of FIG. 8 select the secondary exchange having the lowest latency according to the most recent processing performance measurements. As described above, the latency measurements of the secondary exchanges are executed in response the latency threshold being exceeded. If the set of redirection rules includes a corresponding rule (block 802), example operations of FIG. 8 select an alternate destination for trade orders based on the appropriate redirection rule (block 806).

The example operations of FIG. 8 include setting one or more translation parameters such that the trade orders originally destined for the primary exchange can be formatted for the selected secondary exchange (block 808). In particular, the selected secondary exchange may require trade orders to be formatted and/or to include particular information different from the primary exchange. Alternatively, the selected secondary exchange may deal in tradeable objects having different base lot sizes. A translation multiplier may be specified to normalize between differing order sizes. If the requirements of the selected secondary exchange are the same as the requirements of the primary exchange, setting the translation parameters may involve, for example, setting one or more parameters to null or inapplicable. If the requirements of the selected secondary exchange are different than the requirements of the primary exchange, the example operations of FIG. 8 set the translation according to the requirements of the selected secondary exchange. The example operations of FIG. 8 subject trade orders to be rerouted or redirected to the selected secondary exchange to one or more translation mechanisms or techniques in accordance with the set translation parameters (block 810). Thus, the trade orders directed to the alternative exchange are formatted and/or otherwise conditioned such that the trade orders can be received and processed by the selected secondary exchange. The example of FIG. 8 then ends (block 812).

Figure 9:
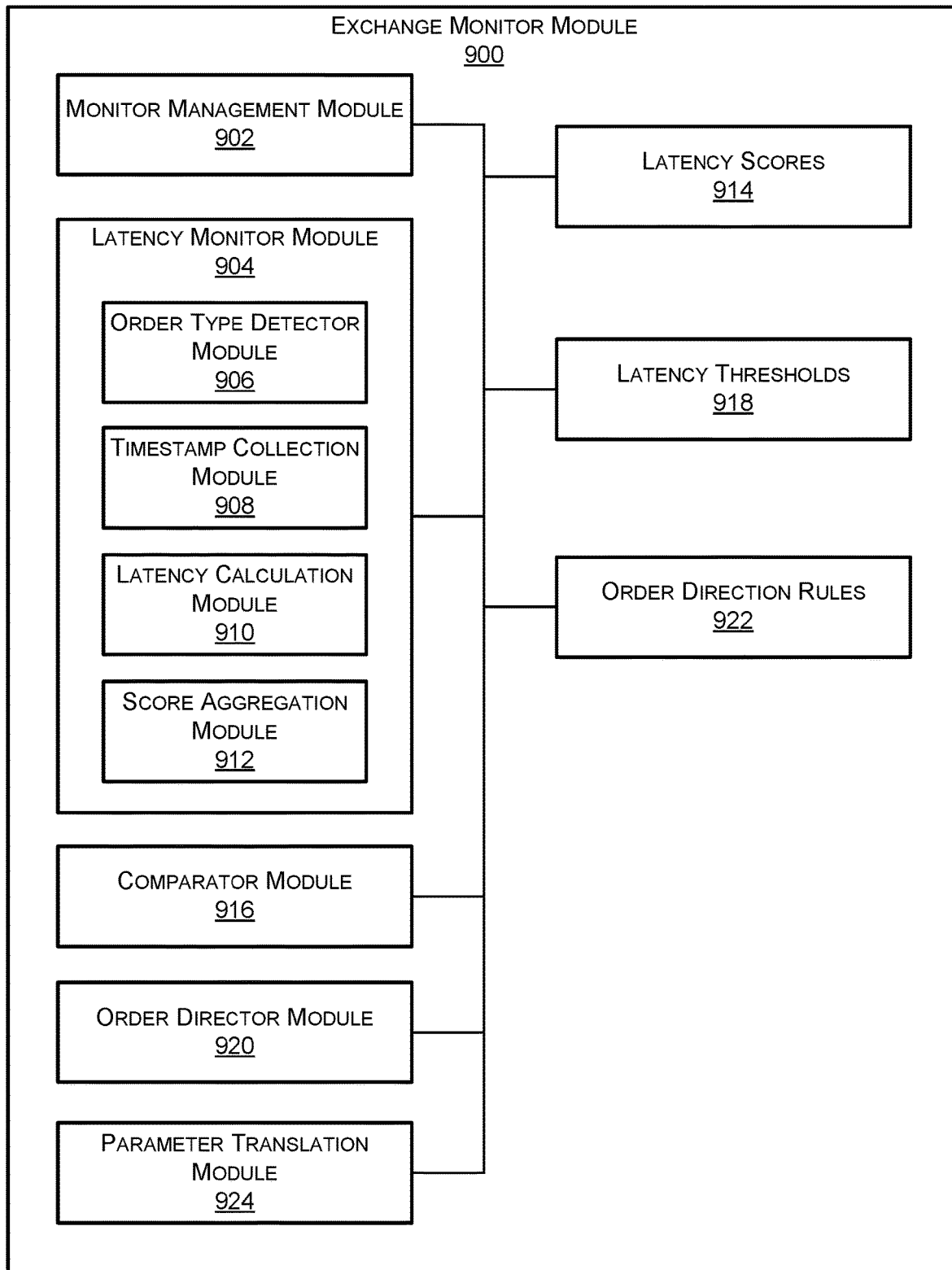
FIG. 9 is a block diagram representative of an example confirmation period module that can implement the example machine readable instructions of FIGS. 4-8.

FIG. 9 is a block diagram of an example exchange monitor module 900 that may implement and/or execute the example operations of FIGS. 4-8. In some examples, the exchange monitor module 900 of FIG. 9 may be implemented as a part of the trading application 330 associated with the trading device 110 of FIG. 1, the trading device 210a of FIG. 2, and/or the gateway(s) 220a-n of FIG. 2. In some examples, the exchange monitor module 900 of FIG. 9 may be implemented as computer implemented code or instructions operable independent of a trading application. In some examples, the features and functionality of the exchange monitor module 900 of FIG. 9 may be implemented in hardware operable in connection with the trading device 110 of FIG. 1, the trading device 210a of FIG. 2, and/or the gateway(s) 220a-n of FIG. 2.

The example exchange monitor module 900 of FIG. 9 includes a monitor management module 902 to maintain information related one or more instances of the exchange latency monitors disclosed herein. For example, in connection with the example operations of FIG. 8, the monitor management module 902 stores and manages assignments and selections of different exchanges as primary exchanges and/or assignments and selections of secondary exchanges. The example monitor management module 902 enables users and/or trading devices to configure the designations of associated with the exchanges. Additionally, in connection with the example operations of FIGS. 4 and/or 6, the monitor management module 902 stores information related to, for example, the latency measurements and/or the selections of the different exchanges as having the lowest latency.

The example exchange monitor module 900 of FIG. 9 includes a latency monitor module 904 to measure processing performance of exchanges. To facilitate the processing performance measurements of one or more exchanges, the example latency monitor module 904 includes an order type detector module 906, a timestamp collection module 908, a latency calculation module 910, and a score aggregation module 912. As described above, one or more aspects of the latency monitoring and/or rerouting of trade orders may depend on a type of the corresponding trade orders. Accordingly, the example order type detector module 906 of FIG. 9 determines a type of trade order in response to, for example, a latency threshold being exceeded, a trade order being subject to routing to a selected alternate exchange, and/or a need to aggregate latency scores for a type-specific trade orders.

The example timestamp collection module 908 of FIG. 9 obtains the order-initiated timestamps and/or the order-processed timestamps described above. The order-initiated timestamp and the order-processed timestamp correspond to a beginning and an end, respectively, of a processing turnaround time for a particular trade order. The example latency calculation module 910 of FIG. 9 calculates a difference between the timestamps to determine the corresponding turnaround time for the trade order, which is indicative of a latency of the trade order. While the example latency calculation module 910 of FIG. 9 is described as using timestamps to determine processing performance of exchanges, additional or alternative methods of measuring processing performance are possible.

The individual latency measurements of the trade orders generated by the latency calculation module 910 are aggregated by the score aggregation module 912 to generate one or more latency scores. The example score aggregation module 912 generates different types of latency scores for different components such as, for example, trade orders of a particular type, the collective trade orders of an exchange, and/or trade orders of user-defined categories. The example exchange monitor module 900 of FIG. 9 stores the latency scores generate by the latency calculation module 910 as latency scores 914.

The example exchange monitor module 900 of FIG. 9 includes a comparator module 916 to compare the latency scores 914 to each other and/or to one or more latency thresholds 918. In some examples, ones of the latency scores 914 corresponding to different exchanges are compared to determine which of the exchanges is to be selected as a destination for trade orders. In some examples, ones of the latency scores 914 corresponding to an exchange are compared to the thresholds 918 to determine whether a secondary exchange should be selected as an alternate destination for trade orders.

The example exchange monitor module 900 of FIG. 9 includes an order director module 920 to route or direct trade orders to different exchanges based on, for example, results of the comparator module 916. For example, when the comparator module 916 identifies one of a group of exchanges having a lowest latency or best processing performance as a destination for trade orders, the example order director module 920 selects the identified exchange as the destination exchange and routes the corresponding trade orders to the identified exchange. Additionally or alternatively, when the comparator module 916 detects that a primary exchange has exceeded a latency threshold, the example order director module 920 selects one of a corresponding group of secondary exchanges as the destination and routes the corresponding trade orders to the selected alternate exchange. In some examples, the order director module 920 references a set of redirection rules 922 when identifying and/or selecting an exchange as a destination for trade orders. Further, the example order director module 920 determines when the primary exchange has recovered to a level of performance below the previously exceeded latency threshold and, in response, routes the corresponding trade orders to the primary exchange.

The example exchange monitor module 900 of FIG. 9 includes a translation module 924 to place one or more trade orders originally intended for a primary exchange in condition for submission and/or processing by a secondary, alternate exchange. The example translation module 924 maintains one or more translation tables or indexes indicative of how different requirements of different exchanges map to each other. Further, example translation module 924 includes a plurality of translation parameters to facilitate the translation of trade orders from one format to another.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A system comprising:
   a gateway in communication with a trading device and one or more electronic exchanges, the gateway configured to:
      measure a first latency associated with a first electronic exchange based on a first processing time of a first trade order, wherein the first processing time is based on a time when the first trade order has been fulfilled by the first exchange, wherein a processing speed of trade orders at the first electronic exchange changes during a trading session; determine that the first trade order is a first type of trade order; determine a collective latency score for the first type of trade order at the first exchange using the first latency;
      receive a second trade order from the trading device;
      determine that the collective latency score reaches a predetermined latency threshold defined for the first exchange; and
      route the second trade order from the trading device to a second exchange based on the first latency associated with the first exchange and in response to identifying the second trade order as being of the first type of trade order.

2. The system of claim 1, wherein the gateway is further configured to:
   measure a second latency associated with the second exchange based on a second processing time of a third trade order, wherein routing the second trade order from the trading device based on the first latency including routing the second trade order to one of the first and second exchanges having a lower latency.

3. The system of claim 1, wherein the gateway is further configured to:
   compare the first latency with the predetermined latency threshold, wherein routing the second trade order from the trading device to the second exchange based on the first latency includes routing the second trade order to the second exchange when the first latency exceeds the predetermined latency threshold.

4. The system of claim 1, wherein the gateway is further configured to:
   reference a set of redirection rules defined by the trading device; and route the second order in accordance with the set of redirection rules.

5. The system of claim 1, wherein the gateway is further configured to:
   determine whether the first latency exceeds a threshold; and calculate, in response to the first latency exceeding the threshold, a second latency for the second exchange based on a second processing time of a third trade order at the second exchange;
   calculate, in response to the first latency exceeding the threshold, a third latency for a third exchange based on a third processing time of a fourth trade order at the third exchange; and
   select, in response to the first latency exceeding the threshold, one of the second and third exchanges having a lower latency for the routing of the second trade order.

6. The system of claim 5, wherein the gateway is further configured to:
cease, in response to determining that the first latency has recovered, the calculations of the second and third latencies and routing trade orders to the first exchange.

7. The system of claim 1, wherein the gateway is further configured to:
receive a first timestamp corresponding to receipt of the first trade order at the first exchange, wherein the processing time is determined based on the first timestamp.

8. The system of claim 1, wherein the first processing time of the first trade order is based on a time it took the first exchange to match a quantity of the first trade order.

9. The system of claim 1, wherein the gateway is further configured to:
receive a second timestamp indicating that the first trade order has been fulfilled by the first exchange, wherein the processing time is further determined based on the second timestamp.

10. The system of claim 9, wherein the second timestamp is defined in a message sent from the first exchange, wherein the message indicates the fulfillment of the first trade order.

11. The system of claim 8, wherein the processing time is based on the first timestamp and the second timestamp.

12. The system of claim 8, wherein the processing time is based on a difference between the first timestamp and the second timestamp.

13. The system of claim 8, wherein the second timestamp is set when the first exchange has matched a quantity of the first order.

14. The system of claim 8, wherein the processing time starts after the first order is received at the first exchange.

15. The system of claim 13, wherein the processing time ends after the first order is fulfilled at the first exchange.

16. The system of claim 13, wherein the processing time ends after a quantity of the first order is matched at the first exchange.

* * * * *